United States Patent [19]

Gilmore et al.

[11] 4,199,608

[45] Apr. 22, 1980

[54] LOW CALORIE CONTAINING IMITATION DAIRY PRODUCTS

[75] Inventors: Cecilia Gilmore; Donald E. Miller, both of Strongsville; Richard J. Zielinski, Middleburg Heights, all of Ohio

[73] Assignee: SCM Corporation, New York, N.Y.

[21] Appl. No.: 924,701

[22] Filed: Jul. 14, 1978

Related U.S. Application Data

[63] Continuation-in-part of Ser. No. 855,878, Nov. 30, 1977, abandoned.

[51] Int. Cl.$^2$ ............... A23C 11/00; A23C 23/00
[52] U.S. Cl. ................. 426/570; 426/564; 426/613; 426/582; 426/583
[58] Field of Search ............ 426/564, 570, 613, 582, 426/583, 654, 104

[56] References Cited

U.S. PATENT DOCUMENTS

| 2,487,698 | 11/1949 | Diamond | 426/570 |
| 3,098,748 | 7/1963 | Noznick et al. | 426/570 |
| 3,346,387 | 10/1967 | Moncrieff et al. | 426/564 |
| 3,785,831 | 1/1974 | Willock | 426/570 |
| 3,806,605 | 4/1974 | Patterson | 426/564 |
| 4,034,122 | 7/1977 | Patterson | 426/570 |

*Primary Examiner*—Jeanette M. Hunter
*Attorney, Agent, or Firm*—Richard H. Thomas

[57] ABSTRACT

Low-calorie imitation dairy products are obtained by elimination of the conventional triglyceride fat content and substituting therefor an edible partial glycerol ester emulsifier in which a major constituent is diglyceride, present in an amount of about 38–48%, based on the ester emulsifier weight. The triglyceride content is less than the mono- and diglyceride contents combined, the ratio of diglyceride to monoglyceride being about 5:1 to about 1.5:1.

33 Claims, No Drawings

LOW CALORIE CONTAINING IMITATION DAIRY PRODUCTS

This application is a continuation-in-part of prior application Ser. No. 855,878, filed Nov. 30, 1977, now abandoned assigned to assignee of the present application.

The present invention relates to novel low-calorie imitation dairy products which are free of added fat giving a substantially reduced calorie content without corresponding loss of desirable properties. The present invention resides principally in the use of an edible partial glycerol ester emulsifier in which a major constituent is diglyceride, present in an amount of about 38–48%. The triglyceride content is less than the mono- and diglyceride content combined, but may be about equal to the diglyceride content, the balance being essentially monoglyceride. A small amount of an additional hydroxy containing emulsifier may be employed to obtain hydrophilicity if necessary.

The present invention will be described principally with respect to a novel whippable topping composition, but it will be understood that for purposes of the present application, the term "imitation dairy products" shall mean a broad spectrum of products closely resembling conventional dairy products; including but not limited to imitation sour cream, coffee whitener, soft cheeses including cream cheese, mellorine, chip dip, cereal creamers, filled milk, and hard cheese. The compositions may be marketed as dry mixes capable of reconstitution by admixture with water or milk, or as fluid compositions purchasable in the fluid state, although it will be apparent to those skilled in the art that the present invention has other applications.

BACKGROUND OF THE INVENTION

Compositions capable of being whipped into fluffy toppings for desserts, salads and the like, either with mechanical mixers or by hand, are presently available on the market, as either dry mixes capable of reconstitution with water or milk; as liquid mixes capable of direct use; or as frozen mixes which require thawing prior to whipping. In addition to flavor and eating qualities, properties desired of the whipped topping compositions are foam stability or firmness (i.e., the ability to hold shape); ease of reconstitution or mixing with water, in the case of dry mixes; acceptable whipping time; and acceptable overrun (the amount of air introduced into the composition during whipping).

Generally speaking, the whippable compositions on the market today have high caloric contents due to the presence of both large amounts of lipid material and large amounts of sugar or sweetener. Attempts have been made to reduce the caloric content by replacing the sugar in whole or in part with an artificial sweetener. However, it is possible that such artificial sweeteners will be banned from use as food additives.

Typically, the fat content of whippable compositions is about 24–28% (about 40 to 60% on a dry basis). U.S. Pat. No. 2,913,342, to Cameron et al, describes a whipped topping composition suitable for spray drying and reconstitution with milk. The product which is spray dried comprises cottonseed oil, propylene glycol monostearate, lecithin, sucrose, non-fat milk solids and water. The cottonseed oil content on a dry weight basis is about 36%, the composition also having about 13% emulsifiers.

A similar disclosure is contained in prior U.S. Pat. No. 3,098,748 to Noznick et al. The composition in this patent contains 40 to 60% fat, 0 to 10% mono- and diglycerides, 0 to 10% of what is called a whipping agent, 5 to 35% sweetener, 1 to 15% protein and other ingredients, on a dry basis.

Prior U.S. Pat. No. 3,224,883, to Pader et al, describes an aerosol topping dispensable from a pressurized container, in the form of an aqueous emulsion. The composition disclosed in this patent is also typical of high fat, high calorie toppings, comprising about 26 to 30% fat and emulsifier (on a web basis). One particular composition disclosed in this patent contains about 30% base fat, 0.6% emulsifier, 10.5% sucrose, 0.3% sodium caseinate, 0 to 0.2% carboxymethyl cellulose, and other ingredients, the remainder being water.

Other representative patents are U.S. Pat. Nos. 3,423,211, to Miles, Jr. et al, describing a dry whippable topping mix containing about 40% fat and emulsifier on a dry basis; and U.S. Pat. No. 3,560,220, to Bangert et al, disclosing the use of about 50% fat and emulsifier, also on a dry basis.

Prior U.S. Pat. No. 3,806,605, to Patterson, discloses a whippable composition which is described as a low fat whipped topping capable of undergoing repeated freezing and thawing cycles without adverse effects. The composition of this patent comprises 10 to 15% by weight of low melting edible vegetable glyceride fat, 2 to 5% of a higher melting edible vegetable glyceride fat, 0.4 to 0.65% of a mixture of lactylic esters of fatty acids and mono- and diglycerides of fatty acids, 0.25 to 0.40% of sorbitan monostearate, and other ingredients. Contrasted with the composition of the present invention, the compositions of this patent can still be characterized as having a high fat content.

SUMMARY OF THE PRESENT INVENTION

The present invention resides in the discovery of low-calorie imitation diary products that are free of added fat, and thus have substantially reduced caloric contents. Specifically, the present invention resides in the discovery that the caloric content can be significantly reduced by replacement of the normal fat content with a partial glycerol ester emulsifier, the major constituent of which is a diglyceride, present in an amount of about 38–48%. The triglyceride content is less than the mono- and diglyceride content combined but may be about equal to the diglyceride content, the balance being essentially monoglyceride.

For purposes of the present application, percentages and ratios are on a weight basis.

A small amount of an additional hydroxy containing emulsifier may be employed to obtain hydrophilicity if necessary.

The emulsifier is unable in the amount of about 3–15%, preferably 3–12% for a whippable topping composition, on a wet basis (i.e., containing the amount of water to obtain a fluid composition), which is substantially lower than the fat content normally required for imitation dairy products. At the same time, the present invention provides compositions having all of the desirable attributes required of conventional imitation dairy products. For instance, in the case of a whippable topping composition, the product of the present invention has good flavor and eating qualities, good foam stability, good overrun, defined as the ability to incorporate air up to 200–300% of the composition initial volume; and good whipping time, defined as the ability to whip to the desired consistency or density, using a household type mixer, in five to 10 minutes. Similar excellent results have been obtained with compositions formulated to simulate other dairy products, for instance sour cream, coffee whitener, mellorine, chip dip and cream cheese.

In the case of dry mixes, the compositions of the present invention are readily reconstituted by admixture with water or milk.

Additional ingredients employed in the compositions of the present invention comprise an edible protein and a stabilizing agent. To obtain a whippable topping product, the composition of the present invention, following ordinary skill in the art, also contains a sweetening agent, wherein the edible protein, stabilizing agent and sweetening agent are employed in proportions sufficient to obtain a composition which is whippable, as defined, to a suitable foam with good overrun. In the case of products such as sour cream and cream cheese, the composition of the present invention also contains an edible acid, in accordance with conventional technology.

Preferably the plastic partial glycerol ester emulsifier has in addition to about 38-48% diglyceride, a diglyceride to monoglyceride ratio of about 5:1 to about 1.5:1, the balance being essentially triglyceride (with small amounts of free glycerin and free fatty acids; e.g., less than 1%). Preferably such ester emulsifiers have about 10% to about 30% monoglyceride, about 38% to about 48% diglyceride, and about 23% to about 46% triglyceride. The partial glycerol ester emulsifiers have an I.V. in the range of about 50 to about 85, a Capillary Melting Point (CMP) in the range of about 105° to about 120° F., and a plastic consistency.

An example of one such emulsifier is disclosed in *Bailey's Industrial Oil and Fat Products*, Third Edition, Interscience Publishers, a Division of John Wiley & Sons, New York, page 955, Table 19.3. The emulsifier contains about 18% monoglyceride, about 48% diglyceride and about 34% triglyceride.

In a preferred embodiment in accordance with the present invention, the emulsifier is a lipid blend prepared by blending together three partial glycerol ester fractions; a mono-diglyceride having a low monoglyceride content, which shall be referred to, for purposes of this application, as the (low mono) mono-diglyceride fraction; a soft mono-diglyceride; and a smaller amount of a hard mono-diglyceride. Up to 10% hard mono-diglyceride (based on the total lipid content) can be used although the hard mono-diglyceride preferably is employed in amounts as low as about 1-2% to obtain the properties desired. In one embodiment, there was prepared a blend containing three lipid fractions; about 74.2% of a (low mono) mono-diglyceride made from 70 I.V. soybean oil having a monoglyceride content of only about 13%, a diglyceride content of about 43% and a triglyceride content of about 43%; about 24.7% of a soft mono-diglyceride having a monoglyceride content of about 40-48%, a diglyceride content of 40-48% and a triglyceride content of 8-12%; and about 1.1% of a hard mono-diglyceride having a monoglyceride content of about 40-48%, a diglyceride content of 40-48% and a triglyceride content of 8-12%. (On a dry basis, total formulation, the lipid blend proportions were 23.44, 7.82 and 0.35, respectively.) The soft and hard mono-diglycerides are marketed by SCM Corporation under the trademark Dur-em 114 (made from a 75-85 I.V. soybean oil, and has a CMP of 110°-125° F.)and Dur-em 117 (made from 5 max. I.V. soybean oil, and has a CMP of 145°-150° F.), respectively. These emulsifier fractions in the proportions stated gave combined mono-, di- and triglyceride contents of about 22%, 43% and 35%, respectively. The lipid blend may contain up to about 1% free glycerin and free fatty acids. In this particular example, the lipid blend had a Capillary Melting Point of about 109° F. and an I.V. of about 72. Other commercially available monoglycerides such as Dur-em 204 and Dur-em 207 (trademarks, SCM Corporation, both containing about 50-60% monoglyceride) and Myverol 18-06 and 18-85 (trademarks, Eastman Chemical, containing about 90% monoglyceride), can be used for blending with the (low mono) mono-diglyceride. The advantage of the use of the several partial glycerol ester emulsifier fractions was that the hard mono-diglyceride provided good overrun properties whereas the soft mono-diglyceride provided good foam stability. The desired ratio of diglycerides to monoglycerides was controlled primarily by adjustment of the amount of the (low mono) mono-diglyceride fraction.

Alternatively, where aeration is not desired, the (low mono) mono-diglyceride may be employed, alone or in a blend with the (soft mono) mono-diglyceride alone.

The partial glycerol esters useful in accordance with the concepts of the present invention are generally a mixture of unsaturated and saturated glyceryl esters of fatty acids typically derived from partially hydrogenated liquid vegetable oils such as soybean oil, cottonseed oil, corn oil, olive oil, peanut oil, safflower oil, coconut oil, and like vegetable oils; plastic fats such as tallow, lard and palm; and blends of the same. They are plastic in consistency and typically have a Capillary Melting Point as high as about 120° F.

A feature of the present invention, for such products as a whippable topping composition or mellorine, may comprise providing a small amount of an additional hydroxy containing emulsifier to obtain hydrophilicity if desired. For instance, the composition of the present invention may employ as ethoxylated fatty acid ester or a polyoxyethylene containing fatty acid ester to facilitate whipping. The class of ethoxylated fatty acid esters useful in the compositions of the present invention are the ethoxylated fatty acid esters of glycerol, hexitol, hexitan and isohexide, as well as the fatty acid esters of ethoxylated glycerol, hexitol, hexitan and isohexide. A preferred class of compounds for use in the compositions of the present invention are the ethoxylated mono- and diglycerides, which are the polyethoxylated fatty acid esters of glycerol, and may be conveniently described as a mixture of stearate, palmitate and lesser amounts of myristate partial esters of glycerin condensed with about 18 to 22 moles, preferably about 20 moles, of ethylene oxide per mole of alpha-monoglyceride reaction mixture, for instance as set forth in Egan U.S. Pat. No. 3,433,645. The fatty acid radicals of ethoxylated monoglycerides preferably are higher fatty acid chains having about 12 to 18 carbon atoms. Representative fatty acid mono- and diesters of glycerin from which the ethoxylated monoglycerides are derived are glycerol monostearate, glycerol distearate, glycerol monopalmitate, glycerol dipalmitate, glycerol monooleate, glycerol dioleate and others.

Preferably, the ethoxylated monoglycerides for this invention have hydroxyl values of about 65 to 80, a saponification number of about 65 to 75, acid values less than about 2 and an oxyethylene content of about 60 to 65 weight percent based on the total ethoxylated glycerides composition. The Capillary Melting Point of ethoxylated mono- and diglycerides is between about 75° to 95° F. and preferably between about 80° to 90° F. Ethoxylated monoglycerides may be prepared by reacting ethylene oxide with a mono- and diglyceride mixture at temperatures of about 145° to 175° C., such as suggested in the Egan U.S. Pat. No. 3,490,918. One suitable ethoxylated mono- and diglyceride that may be employed in the present invention is Santelle EOM (trademark, Durkee Foods Division of SCM Corporation). This emulsifier is manufactured from hydrogenated vegetable oils and has an acid value maximum of 2.0, an hydroxyl value of 60-80, an I.V. number based on fatty acid content of 3 maximum, an oxyethylene content of 60.5-65.0% and a saponification number of 65-75.

Representative of other polyoxyethylene-containing fatty acid esters useful in the present invention are the polysorbates such as polyoxyethylene sorbitol distearate, polyoxyethylene sorbitan monostearate, polyoxyethylene isosorbide dipalmitate, polyoxyethylene sorbitan tristearate as well as other similar ethoxylated fatty acid esters of ethoxylated hexitols, hexitans and isohexides. A preferred such emulsifier is Polysorbate 80 polyoxyethylene sorbitan monooleate.

The amount employed of such other emulsifiers is also known technology, and generally is very small.

The sweetening agent which may be employed in the composition of the present invention may be any of those conventionally used in the production of imitation dairy products, and combinations thereof. Preferably a substantial portion of the sweetening agent is dry corn syrup solids to add bulk to the composition without excessive sweetness. One suitable dry corn syrup solids sweetener available on the market is Dri-Sweet 36, trademark Hubinger Co., having a D.E. of 36. Where less sweetness is desired, for instance in a coffee whitener or cream cheese, a 24 D.E. corn syrup solids may be used. In a mellorine, where more sweetness is desired, a 42 D.E. corn syrup solids may be used. Sucrose and dextrose may be employed in combination with the dry corn syrup solids. A good combination, for instance in a whipped topping composition, comprises about 38% of 36 D.E. corn syrup solids and about 19% sucrose. Another suitable sweetener would be Maltodextrin consisting of a mixture of dextrose, maltose and dextrin. The amount and ratio of dry corn syrup solids to sucrose or other sweetener is not critical except with regard to level of sweetness and bulk desired. For instance, in a sour cream or chip dip formulation generally no sweetening agent would be employed. Generally the amount of sweetening agent will be in the range of about 0-25% (wet basis), preferably about 15-25% for such formulations as a fluid whipped topping or mellorine mix.

An important ingredient of the compositions of the present invention is a stabilizing agent. Preferred such stabilizing agents are microcrystalline cellulose; guar gum; Irish moss (carrageenan); gum tragacanth; gum acacia; gum karaya; locust bean gum; sodium carboxymethyl cellulose; propylene glycol alginate; cellulose ethers such as methylcellulose; low methoxy pectin; sodium alginate; and combinations of the above. One preferred stabilizer for a whipped topping of the present invention is Avicel RC 581, trademark FMC Corp., which is a mixture of cellulose gel (microcrystalline cellulose) and cellulose gum (sodium carboxymethyl cellulose).

The purpose of the stabilizing agent is to offer bodying and water binding properties to the composition. Starches such as rice, potato, corn, tapioca, and pregelatinized starches could also be used to give improved bodying effect.

In a preferred whipped topping formulation, a combination of gums is employed, named Avicel RC 581 with a small amount of carrageenan, in the amount of 0.2-2% (combined, wet basis). Both gums provide a water binding effect, reducing syneresis. Following techniques known in the art, an excessive amount of carrageenan is avoided as such an excessive amount would cause a liquid composition to set up. However, the use of a small amount of carrageenan or similar gum enhances the water binding effect.

Alternatively, the desirable properties of a whipped topping composition of the present invention can be achieved by use of a single stabilizing agent, such as Methocel (trademark, Dow Chemical Co., hydroxypropylmethyl cellulose).

Other dairy product formulations require other stabilizing agents, all in accordance with known technology. The amount used is also in accordance with generally known technology. By way of example, the amount used, on a wet basis, can be between about 0.0% at one extreme for a coffee whitener type formulation, to about 4.0% at the other extreme, for a sour cream type formulation. Preferably the stabilizer is used in the range of about 0.03-2.5.

The formulation of the present invention also employs a water-dispersible or soluble protein. Sodium caseinate is a preferred such protein, for a whippable topping mix, but any water-dispersible or soluble protein may be employed, such as soy protein, non-fat milk solids, whey solids, fish protein, calcium caseinate and cottonseed protein. Other suitable proteins are yeast proteins such as Torula yeast "Torutein-94" (trademark, Amoco Foods Company).

For a whipped topping composition, a preferred amount of protein is about 1-5% wet basis, where the protein is sodium caseinate. If non-fat milk solids is used, which is only about 35% protein, a larger amount, e.g. 10%, may be required. On a wet basis, the protein will normally comprise about 1-5% of the formulation.

The particular acid employed, for such formulations as a sour cream mix, chip dip, or cream cheese, is not critical, except that it should be an edible acid. Very satisfactory results can be obtained with lactic acid. Other suitable acids are hydrochloric acid; phosphoric acid; citric acid; acetic acid; malic acid; tartaric acid; glutaric acid; fumaric; and adipic or blends of these acids. One suitable blend is Genlac C (trademark, General Mills Chemicals, Inc.), a blend of water, citric acid, lactic acid, acetic acid and artificial flavor. A further suitable blend is Stabilac No. 12 (trademark, Battelle Development Corp.) comprising water, citric acid, phosphoric acid, acetic acid and artificial flavoring.

Normally the acid is added after mixture of all other ingredients, and is added in amount necessary to bring the pH to that of the natural product, either acidified or cultured. Normally, this pH will be about 4.6±0.6.

The invention will become more apparent from the following examples. In this application, all percentages are percentages by weight unless otherwise stated.

EXAMPLE 1

The following formulation was employed in the manufacture of a spray dried whippable topping composition:

Table 1

| Ingredients | Percent | |
|---|---|---|
| Sodium caseinate | 7.71 | |
| Avicel RC 581[1] | 2.90 | |
| Gelcarrin MMR[2] | 0.19 | |
| Sugar | 19.28 | |
| 36 D.E. corn syrup solids | 38.31 | |
| Mono-diglyceride[3] (low mono) | 23.44 | Lipid Fractions[6] |
| Dur-em 114[4] | 7.82 | |
| Dur-em 117[5] | 0.35 | |
| Total | 100.00 | |

[1]Trademark, FMC Corp., 89% cellulose gel and 11% cellulose gum.
[2]Trademark, Marine Colloids, Inc., carrageenan.
[3]Mono-diglyceride (low mono) made from 70 I.V. soybean oil (mono-glyceride 13%, diglyceride 43%, triglyceride 43%).
[4]Trademark, SCM Corp., mono-diglyceride made from 75-85 I.V. soybean oil (monoglyceride 40-48%, diglyceride 40-48%, triglyceride 8-12%).
[5]Trademark, SCM Corp., mono-diglyceride made from 0-5 I.V. soybean oil (monoglyceride 40-48%, diglyceride 40-48%, triglyceride 8-12%).
[6]The lipid composition calculates to be about 22% mono-, 43% di- and 35% triglycerides, with up to about 1% free glycerin and free fatty acids.

The following procedure was employed. First, the Avicel RC 581 was added to water sufficient to disperse the Avicel. A dry mix of sodium caseinate, Gelcarrin MMR, sugar and corn syrup solids was then added to the water/Avicel mixture. This was heated to about 125° F. and was mixed with premelted lipids in the amounts stated. The entire mixture was pasteurized at 165° F. for 30 minutes, homogenized at 3,000-500 p.s.i. through a two-stage homogenizer, and then was spray dried to remove water. The resultant powder was tempered at about 40° F. for 24 hours.

The composition of this dried topping base was then mixed with additional sugar, salt, cellulose gel and cellulose gum and imitation flavor in the following proportions:

Table 2

| Ingredients | Weight/ grams | Percent |
|---|---|---|
| Topping base (Table 1) | 42.53 | 90.41 |
| Sugar | 4.00 | 8.50 |
| Salt | 0.15 | 0.32 |
| Cellulose gel and cellulose gum | 0.30 | 0.64 |
| Imitation flavor | 0.06 | 0.13 |
| Totals | 47.04 | 100.00 |

When ready for use, the composition of the dry topping mix of Table 2 is mixed with vanilla extract and water in the following proportions:

Table 3

| Ingredients | Weight/ grams | Percent |
|---|---|---|
| Dry topping mix (from Table 2) | 47.04 | 29.01 |
| ½ tsp. vanilla extract | 1.70 | 1.05 |
| Water, 40° F. (4 oz. by volume) | 113.40 | 69.94 |
| Totals | 162.14 | 100.00 |

The dried topping mix was readily mixed with water and the vanilla extract, and when mixed gave a composition that was readily whippable in five to ten minutes to the desired density; gave good overrun, up to 200 to 300%; and provided good foam stability. The total lipid content on a wet basis was about 8%.

EXAMPLE 2

This example concerns a liquid composition in accordance with the concepts of the present invention. The composition employed was as follows:

Table 4

| Ingredients | Percent |
|---|---|
| Sodium caseinate | 2.00 |
| Avicel RC 581 | 0.75 |
| Carrageenan | 0.05 |
| 36 D.E. corn syrup solids | 10.00 |
| Sugar | 10.00 |
| Mono-diglyceride | 7.60 |
| Durfax 80 (Polysorbate 80) | 0.03 |
| Water | balance |
| Total | 100.00 |

In this example, the mono-diglyceride was a blend of about 7% of a (low mono) mono-diglyceride partial glycerol ester having a low monoglyceride content, about 0.50% of a soft monoglyceride, and about 0.1% of a hard monoglyceride. The specific soft and hard mono-diglycerides employed were Dur-em 104 (trademark, SCM Corporation, from a 70-85 I.V. vegetable oil) having a CMP of about 115°-121° F.; and Dur-em 117, discussed above. The mono-diglyceride having a low monoglyceride content was made from 70 I.V. soybean oil, and had a monoglyceride content of about 12.6, a diglyceride content of about 41.3 and a triglyceride content of about 45.2. The monoglyceride content of the lipid blend was about 15%, with approximately equal amounts of di- and triglyceride and up to about 1% free glycerin and free fatty acids. The lipid blend had a CMP and an I.V. approximately the same as that of Example 1.

In the above composition of Table 4, the Durfax 80 (trademark, SCM Corporation) was added to facilitate whipping. Durfax 80 could be used in the spray dried mix of Example 1, but is not required for optimum results. Up to 0.1% can be used.

The above composition was whippable in a household type mixer and produced a whipped topping having the desired density in five to ten minutes. The composition had good overrun and good foam stability. The caloric content of the whipped topping composition was 157 calories per 100 grams which is about 55% reduction from a 36% butterfat whipping cream without added sugar. The caloric content of a 36% whipping cream is about 346 calories per 100 grams. The caloric content of a standard 27% vegetable fat whipped topping is about 298 calories per 100 grams or 47% more than the caloric content of the whipped topping composition of this example.

In Examples 1 and 2, the lipid fractions employed, based on the total lipid content, calculated to be:

Table 5

| Ingredients | Example 1 | Example 2 | Preferred Range |
|---|---|---|---|
| Mono-diglyceride fraction (low mono) | 74.2 | 92.1 | 60-95 |
| Soft mono-diglyceride | 24.7 | 6.6 | 5-25 |

Table 5-continued

| Ingredients | Example 1 | Example 2 | Preferred Range |
|---|---|---|---|
| Hard mono-diglyceride | 1.1 | 1.3 | 1–2 |
| Totals | 100.0 | 100.0 | |

In both Examples 1 and 2, the compositions employed a mixture of microcrystalline cellulose and carrageenan. Both offer good water binding properties. The microcrystalline cellulose is preferred as it has a relatively low caloric content. Carrageenan is a carbohydrate and has some caloric content, but a small amount is used as it has very strong water binding properties.

It is understood that the composition of the present invention can employ additional ingredients such as colorings and flavorings; e.g., fruits, syrups, cocoa, and chocolate. Known whipping agents can be added to the compositions of the present invention such as Marvic acid* (trademark, SCM Corporation); sorbitan esters, such as sorbitan monostearate; polyglycerol esters; and whipping agents purchasable on the market. Other ingredients, known to those skilled in the art, can be employed.
* Lactylic esters of fatty acids, Capillary Melting Point 122°–132° F., monolactic esters 40% minimum.

It is possible, with regard to the spray dried composition, that the actual product sold will be the dry topping mix in Table 2. Thus, it is convenient to set forth proportions on a dry basis, as follows.

Table 6

| Ingredients | Example 1/Table 2 Percent | Preferred Range, Approximate |
|---|---|---|
| Sodium caseinate | 6.97 | 5–12 |
| Total gums | 3.44 | 2–5 |
| Sweetener | 60.57 | 50–70 |
| Lipid fractions | 28.57 | 24–33 |
| Salt | 0.32 | up to 0.4 |
| Flavor | 0.13 | up to 0.2 |

In a preferred embodiment, the whippable topping composition comprises, on a wet basis: about 5–12% (preferably about 7–12%) plastic partial glycerol ester emulsifier of which the di- and triglycerides are present in high proportions and the monoglyceride content is present in low proportion (e.g., more than 10% but not substantially greater than about 30% based on the lipid content); about 1–5% of an edible protein; about 0.2–2% of a stabilizing agent; and about 15–25% of a sweetening agent.

EXAMPLE 3

This example illustrates the preparation of a low-calorie imitation sour cream product in accordance with the concepts of the present invention. The following ingredients were employed: protein about 1–5%, stabilizing agent about 1–4%; lipid about 3–8%; acid to pH of about 4.6±0.6; water remainder. In a specific example, the composition contained:

Table 7

| Ingredients | Percent |
|---|---|
| Non-fat milk solids (35% protein) | 8.89 |
| Stabilac No. 113[1] | 1.98 |
| Mono-diglyceride[2] | 4.94 |
| Dur-em 114[3] | 0.49 |
| Stabilac No. 12[4] | 1.23 |
| Water | 82.43 |

Table 7-continued

| Ingredients | Percent |
|---|---|
| Total | 100.00 |

[1]Trademark of the Battelle Development Corp., stabilizer made from modified food starch, mono-diglycerides, guar gum, corn syrup solids, salt, modified non-fat dry milk solids, sodium phosphate, carrageenan, sodium alginate.
[2]Mono-diglyceride (low mono) made from 70 I.V. soybean oil (mono-glyceride 13%, diglyceride 43%, triglycceride 43%).
[3]Trademark SCM Corp. (monoglyceride 40–48%, diglyceride 40–48%, triglyceride 8–12%).
[4]Trademark of the Battelle Development Corp., an instant acid for sour cream made of water, citric acid, phosphoric acid, acetic acid, artificial flavoring.

The combination of emulsifiers provides a blend containing about 0.86% monoglyceride, about 2.34% diglyceride and about 2.17% triglyceride, wet basis.

The sour cream product was obtained by heating the water and emulsifier fractions independently to about 125° F. and blending them together. The remaining ingredients except acid were then added to the blend, and the entire mixture was pasteurized at 165° F. for 30 minutes, homogenized at 2,000–500 psi through a two-stage homogenizer, and then cooled to room temperature. At that time the acid was then blended into the formulation until a pH of about 4.6 was reached (about 1% acid, wet basis).

The caloric content of the described imitation sour cream was 0.90 calories per gram which is about a 58% reduction of the caloric content over natural sour cream. The caloric content of an imitation sour cream listed in the USDA Agriculture Handbook No. 8-1 is 50% more than the caloric content of the present invention.

EXAMPLE 4

This example illustrates the preparation of a low-calorie coffee whitener in accordance with the concepts of the present invention. Broadly the composition includes (in approximate proportions) 0.1–0.7% buffering agent, 0.5–3.5% protein, 0–0.07% stabilizing agent, 3–7% lipid, and 4–15% sweetening agent, the remainder being water. In a specific example, the following ingredients were employed:

Table 8

| Ingredients | Percent |
|---|---|
| Dipotassium phosphate | 0.30 |
| 24 D.E. corn syrup solids | 10.00 |
| Sodium caseinate (90% protein) | 1.25 |
| Carrageenan | 0.04 |
| Mono-diglyceride (low mono) | 5.00 |
| Water | 83.41 |
| Total | 100.00 |

In the above formulation, the dipotassium phosphate serves as a buffering agent. Coffee is acidic and in the absence of the dipotassium phosphate, the casein could precipitate. Other buffering agents known in the art could be used than dipotassium phosphate.

In this example, the mono-diglyceride was the "low mono" mono-diglyceride fraction used to prepare the mono-diglyceride blend of Example 1; made from 70 I.V. soybean oil providing a monoglyceride content of about 13%, a diglyceride content of about 43% and a triglyceride content of about 43%. The presence of soft and hard mono-diglycerides was not needed since aeration was not desired. Other emulsifiers such as EC 117 M (trademark, SCM Corporation, containing 70% Dur-em 117, and 30% Marvic acid) may be added to obtain even better whitening properties.

A 24 D.E. corn syrup solids adds the bulk and sweetness desired.

EXAMPLE 5

This example illustrates the preparation of a cream cheese in accordance with the concepts of the present invention. Broadly the cream cheese composition contains 1-5% protein, 1-4% stabilizing agent, 8-15% lipid, 4-10% sweetening agent, and acid added to obtain a pH of about 4.6+0.6, the remainder being water. In a specific example, the following formulation was employed:

Table 9

| Ingredients | Percent |
| --- | --- |
| Sodium caseinate (90% protein) | 2.00 |
| 24 D.E. corn syrup solids | 7.00 |
| Salt | 0.15 |
| Stabilizer | 2.40 |
| Mono-diglyceride | 11.40 |
| Water | 77.05 |
| Total | 100.00 |

To the above formulation, an acid, Genlac Acid C, trademark, General Mills Chemicals, Inc., was added in an amount of about 1%, again sufficient to obtain a pH of about 4.6, the pH of natural cream cheese. The pH is not critical and could be slightly lower or higher, plus or minus about 0.6.

In place of sodium caseinate, a non-fat milk solids (about 9-10%) could be employed.

The mono-diglyceride in this example was about 11.00% (on a wet basis, entire formulation) of the (low mono) mono-diglyceride of Example 1, and about 0.4% (wet basis, entire formulation) of Dur-em 114 (also of Example 1). The stabilizer was Genlac Base S, trademark, General Mills Chemicals, Inc., comprising wheat starch, vegetable gum, monoglycerides, sodium caseinate and salt.

The cream cheese product was made by mixing the ingredients, of the above Table, together, following generally the procedure of Example 3, and then adding the acid to the resultant mixture, with mixing, to the desired pH.

EXAMPLE 6

This example illustrates the preparation of a mellorine. Broadly the mellorine composition comprises about 1.5-5% protein, about 0.05-2.0% stabilizing agent, about 3-6% lipid and about 10-17% sweetening agent, the remainder being water. A specific example is one using the following formulation:

Table 10

| Ingredients | Percent |
| --- | --- |
| Non-fat milk solids | 10.00 |
| Sugar | 12.00 |
| 42 D.E. corn syrup solids | 5.00 |
| Mono-diglyceride | 5.00 |
| Stabilizer | 0.10 |
| Ice #2 | 0.25 |
| Water | 67.65 |
| Total | 100.00 |

The non-fat milk solids of the above formulation offers better flavor, but is only about 35% protein, as compared to about 90% protein for sodium caseinate. Hence, more of this specific ingredient was employed to form the desired emulsion, although the actual protein content is in the desired 1.5-5% range. A 42 D.E. corn syrup solids provided bulk and more sweetness. The mono-diglyceride employed in this example was the (low mono) mono-diglyceride of Example 1. The Ice #2, trademark, SCM Corporation, is an emulsifier comprising about 80% Dur-em 117 (the hard mono-diglyceride of Example 1, from 0-5 I.V. soybean oil comprising about 40-48% monoglyceride, 40-48% diglyceride and 8-12% triglyceride) and about 20% polysorbate 80 (to obtain hydrophilicity).

The stabilizer in this example was HG Stabilizer, trademark, Germantown Manufacturing, comprising cellulose gum, vegetable gum, carrageenan, standardized with dextrose.

EXAMPLE 7

This example illustrates a chip dip formulation in accordance with the concepts of the present invention. Broadly the chip dip formulation contains about 1-5% protein, about 1-4% stabilizing agent, about 3-8% lipid, about 2-8% seasoning and sufficient acid to obtain a pH of about 4.6±about 0.6, the remainder being water. In a specific example, the following formulation was employed:

Table 11

| Ingredients | Percent |
| --- | --- |
| Non-fat milk solids (35% protein) | 8.57 |
| Stabilizer | 1.91 |
| Mono-diglyceride | 4.76 |
| Dur-em 114 | 0.48 |
| Water | 79.52 |
| Chip dip seasoning | 4.76 |
| Total | 100.00 |

Basically, the formulation is the same as the sour cream formulation of Example 3, the stabilizer being the same (Stabilac No. 113); and the emulsifiers being the same. The chip dip was made by adding chip dip seasoning to the formulation.

As in Example 3, the formulation was prepared by mixing the ingredients of the above Table, except the seasoning. The product was then acidified to a pH of about 4.6. The acid employed was Stabilac No. 12, in the amount of about 1.2%. The seasoning was then blended into the acidified product.

What is claimed is:

1. A low-calorie imitation dairy product comprising a water-dispersible or soluble protein, stabilizing gum and lipid, in amounts effective to provide properties of conventional dairy products, wherein the total lipid content consists essentially of a plastic edible partial glycerol ester emulsifier of which a major constituent is diglyceride, present, based on the lipid weight, in an amount of about 38-48%, the triglyceride content being less than the mono- and diglyceride contents combined, the ratio of diglyceride to monoglyceride being about 5:1 to about 1.5:1.

2. The dairy product of claim 1 further comprising water and on a wet weight basis about 3-15% of said partial glycerol ester emulsifier.

3. The dairy product of claim 2 wherein said partial glycerol ester emulsifier has an I.V. of about 50-85 and a CMP of about 105°-120° F.

4. The dairy product of claim 3 wherein said partial glycerol ester emulsifier contains about 10% to about 30% monoglyceride; about 38% to about 48% diglyceride; and about 23% to about 46% triglyceride.

5. A fluid whippable topping composition comprising a water-dispersible or soluble protein, a stabilizing agent, a sweetening agent, a lipid and water, in whippable amounts effective to provide a stable whipped topping having good overrun, where the total lipid content consists essentially of a plastic edible partial glycerol ester emulsifier of which a major constituent is diglyceride, present based on the lipid weight in an amount of about 38–48%, the triglyceride content being less than the mono- and diglyceride contents combined, the ratio of diglyceride to monoglyceride being about 5:1 to about 1.5:1, the partial glycerol ester being present in the range of about 5–12% on a wet basis.

6. The composition of claim 5 wherein said partial glycerol ester emulsifier is a blend of partial glycerol ester emulsifier fractions of which a major portion is a mono-diglyceride having a ratio of diglyceride to monoglyceride more than about 1.5:1; a soft mono-diglyceride having a CMP in the range of about 110°–125° F.; and a hard mono-diglyceride having a CMP in the range of about 145°–150° F.; the hard monoglyceride being less than 10% of said blend.

7. The composition of claim 5 further including a polyoxyethylene containing fatty acid ester or ethoxylated fatty acid ester in sufficient amount to facilitate whipping.

8. The composition of claim 5 for a liquid topping composition which consists essentially of
protein: about 1–5%
stabilizing agent: about 0.2–2%
sweetening agent: about 15–25%
partial glycerol ester emulsifier: about 5–12% water: remainder.

9. The composition of claim 6 rendered to a free-flowing particulate state.

10. A low-calorie liquid whippable topping composition consisting essentially of, as the functional ingredients, the following composition:
water-dispersible or soluble protein: about 1–5%
stabilizing agent: about 0.2–2%
sweetening agent: about 15–25%
partial glycerol ester emulsifier: about 5–12%
polysorbate 80: up to 0.1%
water: remainder
said emulsifier being a mono- and diglyceride of which a major constituent is diglyceride with the proviso that the ratio of diglycerides to monoglycerides is about 5:1 to about 1.5:1, the triglyceride content being less than the mono- and diglyceride contents combined, said emulsifier having a Capillary Melting Point between about 105° and about 120° F. and an I.V. between about 50 and about 85, said emulsifier containing based on the lipid weight about 10% to about 30% monoglyceride; about 38% to about 48% diglyceride; and about 23% to about 46% triglyceride, proportions of the mono, di- and triglyceride contents being supplied by soft and hard mono-diglycerides.

11. A low-calorie dry mix whippable composition consisting essentially of, as the functional ingredients, a water-soluble or dispersible protein, a stabilizing agent, a sweetening agent, and a partial glycerol ester emulsifier, in the following approximate proportions, on a wet basis when reconstituted with water:
protein: 1–5%
stabilizing agent: 0.2–2%
sweetening agent: 15–25%
partial glycerol ester emulsifier: 5–12%
said emulsifier comprising at least about 38–48% diglyceride with the proviso that the ratio of diglycerides to monoglycerides is about 5:1 to about 1.5:1, the triglyceride content being less than the mono- and diglyceride contents combined, said emulsifier having a Capillary Melting Point between about 105° and about 120° and an I.V. between about 50 and about 85.

12. The composition of claim 11 wherein said partial glycerol ester emulsifier has a monoglyceride content of about 10% to about 30%, a diglyceride content of about 38% to about 48% and a triglyceride content of about 23% to about 46%.

13. The composition of claim 12, wherein said partial glycerol ester emulsifier is a blend of partial glycerol ester emulsifier fractions, said blend comprising about 1–10% of a hard mono-diglyceride having a Capillary Melting Point of about 145°–150° F., a sufficient amount of a mono-diglyceride having a low monoglyceride content to obtain a ratio of diglycerides to monoglycerides in said blend of 5:1–5:1, the remainder being a soft mono-diglyceride having a Capillary Melting Point of about 110°–125° F.

14. The composition of claim 13 wherein said partial glycerol ester emulsifier blend comprises about 5–25% soft mono-diglyceride, about 1–2% hard mono-diglyceride, and about 60–95% mono- and diglyceride having a diglyceride to monoglyceride ratio of greater than 1.5:1.

15. A low-calorie dry mix whippable composition consisting essentially of, as the functional ingredients, a water-soluble or dispersible protein, a stabilizing agent, a sweetening agent, and a partial glycerol ester emulsifier, in the following approximate proportions, on a dry basis:
protein: 5–12%
stabilizing agent: 2–5%
sweetening agent: 50–70%
partial glycerol ester emulsifier: 24–33%
said emulsifier being a mono- and diglyceride of which a major constituent is diglyceride with the proviso that the ratio of diglycerides to monoglycerides is about 5:1 to about 1.5:1, the triglyceride content being less than the mono- and diglyceride contents combined, said emulsifier having a Capillary Melting Point between about 105° and about 120° F. and an I.V. between about 50 and about 85, said emulsifier containing based on the lipid content about 10% to about 30% monoglyceride; about 38% to about 48% diglyceride; and about 23% to about 46% triglyceride, proportions of the mono-, di- and triglyceride contents being supplied by soft and hard mono-diglycerides.

16. A low-calorie imitation acid containing dairy cream composition such as a sour cream or chip dip comprising a water-soluble or dispersible protein, a stabilizing agent, a lipid and acid, in amounts effective to provide properties of conventional such acid containing compositions, wherein the total lipid content consists essentially of a plastic edible partial glycerol ester emulsifier of which a major constituent is diglyceride, present based on the lipid weight in an amount of about 38–48%, the triglyceride content being less than the mono- and diglyceride contents combined, the ratio of diglyceride to monoglyceride being about 5:1 to about 1.5:1, said partial glycerol ester being present in the amount of about 3–8%.

17. The composition of claim 16 wherein said emulsifier contains about 10% to about 30% monoglyceride, about 38% to about 48% diglyceride and about 23% to about 46% triglyceride and has an I.V. of about 50–85 and a CMP of about 105°–120° F., proportions of the mono-, di- and triglycerides being supplied by a soft mono-diglyceride.

18. The composition of claim 17 for a sour cream comprising protein, stabilizing agent, lipid and acid in the following approximate proportions, wet basis, total composition:
 protein: 1–5
 stabilizing agent: 1–4
 lipid: 3–8
 acid: to desired pH
 water: remainder
said acid being added subsequent to blending the other ingredients of the product, to a pH of about 4.6 plus or minus about 0.6.

19. The product of claim 18 wherein the protein is derived from non-fat milk solids.

20. A low-calorie imitation coffee whitener composition comprising a water-dispersible or soluble protein, stabilizing agent and lipid, in amounts effective to provide properties of conventional coffee whitener, wherein the total lipid content consists essentially of a plastic edible partial glycerol ester emulsifier of which a major constituent is diglyceride, present based on the lipid weight in the amount of about 38–48%, the triglyceride content being less than the mono- and diglyceride contents combined, the ratio of diglyceride to monoglyceride being about 5:1 to about 1.5:1, said partial glycerol ester emulsifier being present in the amount of about 3–7%.

21. The coffee whitener of claim 20 comprising protein, stabilizing agent, lipid and sweetening agent in the following approximate proportions, wet basis, total composition:
 buffering agent: 0.1–0.7
 protein: 0.5–3.5
 stabilizing agent: 0–0.07
 lipid: 3–7
 sweetening agent: 4–15
 water: remainder.

22. A coffee whitener of claim 21 wherein the protein is derived from sodium caseinate.

23. A low-calorie imitation cream cheese composition comprising a water-soluble or dispersible protein, stabilizing agent, lipid, sweetening agent and acid, in amounts effective to provide properties of conventional cream cheese, wherein the total lipid content consists essentially of a plastic edible partial glycerol ester emulsifier of which a major constituent is diglyceride, present based on the lipid weight in an amount of about 38–48%, the triglyceride content being less than the mono- and diglyceride contents combined, the ratio of diglyceride to monoglyceride being about 5:1 to about 1.5:1, said partial glycerol ester emulsifier being present in the amount of about 8–15%.

24. The cream cheese of claim 23 wherein said emulsifier contains about 10% to about 30% monoglyceride, about 38% to about 48% diglyceride and about 23% to about 46% triglyceride and has I.V. of about 50–85 and a CMP of about 105°–120° F., proportions of the mono-, di- and triglycerides being supplied by a soft mono-diglyceride.

25. The cream cheese of claim 24 comprising protein, stabilizing agent, lipid, sweetening agent and acid in the following approximate proportions, wet basis, total composition:
 protein: 1–5
 stabilizing agent: 1–4
 lipid: 8–15
 sweetening agent: 4–10
 acid: to desired pH
 water: remainder
said acid being added subsequent to blending the other ingredients of the product, to a pH of about 4.6 plus or minus about 0.6.

26. The cream cheese of claim 25 wherein the protein is derived from sodium caseinate.

27. A low-calorie imitation mellorine composition comprising a water-dispersible or soluble protein, stabilizing agent, lipid and sweetening agent, in amounts sufficient to provide properties of conventional dairy products, wherein the total lipid content consists essentially of a plastic edible partial glycerol ester emulsifier of which a major constituent is diglyceride, present based on the lipid weight in the amount of about 38–48%, the triglyceride content being less than the mono- and diglyceride contents combined, the ratio of diglyceride to monoglyceride being about 5:1 to about 1.5:1, the partial glycerol ester being present in the amount of about 3–6%.

28. The composition of any of claims 5, 20 and 27 wherein said emulsifier contains about 10% to about 30% monoglyceride, about 38% to about 48% diglyceride and about 23% to about 46% triglyceride and has an I.V. of about 50–85 and a CMP of about 105°–120° F., proportions of the mono-, di- and triglycerides being supplied to a soft and/or hard mono-diglyceride.

29. The composition of claim 28 for a mellorine comprising protein, stabilizing agent, lipid and sweetening agent in the following approximate proportions, wet basis, total composition:
 protein: 1.5–5
 stabilizing agent: 0.05–2.0
 lipid: 3–6
 sweetening agent: 10–17
 water: remainder.

30. The mellorine of claim 29 further containing 0–0.1% of a polyoxyethylene fatty acid ester.

31. The mellorine of claim 29 wherein said protein is derived from non-fat milk solids.

32. The composition of claim 17 for a chip dip comprising protein, stabilizing agent, lipid and acid in the following approximate proportions, wet basis, total composition:
 protein: 1–5
 stabilizing agent: 1–4
 lipid: 3–8
 acid: to desired pH
 seasoning: 2–8
 water: remainder
said acid being added subsequent to blending the other ingredients of the product, except seasoning, to a pH of about 4.6 plus or minus about 0.6.

33. The chip dip of claim 32 wherein said protein is derived from non-fat milk solids.

* * * * *

UNITED STATES PATENT AND TRADEMARK OFFICE
CERTIFICATE OF CORRECTION

PATENT NO. : 4,199,608
DATED : April 22, 1980
INVENTOR(S) : Cecilia Gilmore, Donald E. Miller and Richard J. Zielinski It is certified that error appears in the above-identified patent and that said Letters Patent are hereby corrected as shown below:

Column 2, line 55, change "unable" to --usable--.

Column 3, line 67, before "Dur-em 114" change "trademark" to --trademarks--.

Column 11, line 12, change "4.6 + 0.6" to --4.6 $\pm$ 0.6--.

Column 13, line 19, in claim 6, before "mono-diglyceride" insert --(low mono)--.

Column 14, line 21, in claim 13, change "5:1-5:1" to --5:1-1.5:1--.

Signed and Sealed this

Ninth Day of September 1980

[SEAL]

Attest:

SIDNEY A. DIAMOND

Attesting Officer    Commissioner of Patents and Trademarks